(12) United States Patent
Chang et al.

(10) Patent No.: US 6,426,965 B1
(45) Date of Patent: Jul. 30, 2002

(54) OPTICAL FIBER CASCADED RAMAN LASER SCHEME

(75) Inventors: Do Il Chang, Seoul; Min Yong Jeon, Taejon; Hak Kyu Lee, Taejon; Kyong Hon Kim, Taejon, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,457

(22) Filed: Feb. 4, 2000

(30) Foreign Application Priority Data

Dec. 27, 1999 (KR) .............................................. 99-62380

(51) Int. Cl.$^7$ ................................................. H01S 3/30
(52) U.S. Cl. ............................. 372/3; 372/102; 372/28; 372/32
(58) Field of Search .............................. 372/3, 102, 28, 372/32; 385/37, 24, 15; 359/133, 125, 130

(56) References Cited

U.S. PATENT DOCUMENTS

| | | | |
|---|---|---|---|
| 4,794,598 A | | 12/1988 | Desurvire et al. ............. 372/3 |
| 5,050,183 A | * | 9/1991 | Duling, III .................... 372/94 |
| 5,323,404 A | | 6/1994 | Grubb ............................ 372/6 |
| 5,778,014 A | * | 7/1998 | Islam ............................. 372/6 |
| 6,052,393 A | * | 4/2000 | Islam ............................. 372/6 |
| 6,163,396 A | * | 12/2000 | Webb ......................... 359/332 |
| 6,163,554 A | * | 12/2000 | Chang et al. .................. 372/6 |

OTHER PUBLICATIONS

Kim, N.S.; Prabhu, M.; Li, C.; Song, J.; Shen, D; Ueda, K; "Ge–doped Raman fiber amplifer with enhanced signal–to ratio using second Stoke control pulse and effect of do Rayleigh back–scattering", Laser and electro–opt. Cleo/ Pacific Rim vol. 3, p. 654–65.*

(List continued on next page.)

Primary Examiner—Paul Ip
Assistant Examiner—Delma R. Flores Ruiz
(74) Attorney, Agent, or Firm—SEED IP Law Group PLLC (57) ABSTRACT

An optical fiber cascaded Raman laser scheme is provided. An optical fiber cascaded Raman laser scheme in accordance with an embodiment of the present invention includes a pump light source, an optical fiber, a wavelength division multiplexing optical fiber combiner, another wavelength division multiplexing optical fiber combiner, a short period optical fiber bragg grating, a long period bragg grating, first means, and second means. The pump light source generates pump light. The optical fiber causes Raman scattering regarding the optical pump light as nonlinear material. The wavelength division multiplexing optical fiber combiner forms intra cavity regarding light of second order stoke frequency shifted wavelength. The light is stoke frequency shifted by Raman scattering of the optical fiber. The another wavelength division multiplexing optical fiber combiner forms intra cavity regarding light of first and third order stoke frequency shifted wavelength. The light is stoke frequency shifted by Raman scattering of the optical fiber. The short period optical fiber bragg grating selects and reflects fourth stoke frequency shifted wavelength of output wavelength in intra cavity. The intra cavity is formed by the wavelength division multiplexing optical fiber combiner. The long period bragg grating causes loss on fifth order stoke frequency shifted wavelength and prevents oscillation. The fifth order is next order of output wavelength of the intra cavity. The first means passes pump light emitted from the pump light source and reflects light of fourth order stoke frequency shifted output wavelength. The first means is connected between the pump light source and the wavelength division multiplexing optical fiber combiner. The second means reflects pump light emitted from the pump light source and passing light of output wavelength.

8 Claims, 4 Drawing Sheets

OTHER PUBLICATIONS

Archambault, J. and Grubb, S., "Fiber Gratings in Lasers and Amplifiers," *Journal of Lightwave Technology* 15(8):1378–1390, Aug. 1997.

Dianov, E.M. et al., "Novel High Power 1.24 μm and 1.48 μm Raman Lasers Based on Phosphosilicate Fiber," *Conference on Bragg Gratings, Photosensitivity and Poling in Glass Fibers and Waveguides: Applications and Fundamentals*, pp. 129–131, Oct. 1997.

Chernikov, S.V. et al., "High–Power, Compact, High–Efficiency, Fiber Laser Source Around 1.24 μm for Pumping Raman Amplifiers," *OFC '97 Technical Digest*, p. 345, 1997.

* cited by examiner

OPTICAL FIBER CASCADED RAMAN LASER SCHEME

TECHNICAL FIELD

The present invention relates to a Raman laser that is used as a pump light of the optical amplifier in high-capacity long-distance optical communication network. In particular, the Raman laser in accordance with an embodiment of the present invention has simple structure and achieves high performance.

BACKGROUND OF THE INVENTION

As high-powered lasers like Ytterbium doped optical fiber laser has been developed, Raman laser that uses the high-powered lasers as the pump light is known as an important technology to obtain high-powered laser through wide wavelength range.

Especially, regarding ultra optical wavelength technologies of 1.4 μm~1.6 μm, high-powered lasers that are able to operate in wide wavelength range are very useful as a pump light of optical fiber Raman lasers. The ultra optical wavelength technologies utilize low loss wavelength range for tens of tera bit range optical communications.

Currently, in S-band of 1.49~1.53 μm, appropriate material is not found for optical fiber amplifier and therefore importance of Raman amplifier is well known. However, a pump laser light source for high-powered operation has not been proposed yet.

Conventional optical fiber cascaded Raman lasers utilize an optical fiber bragg grating and implement a Raman resonator of stoke frequency shifted. This method employs two optical fiber bragg gratings that have maximum reflection ratio regarding stoke frequency shifted wavelength and the two terminals of the optical fibers have nonlinear Raman effect. Also, the two optical fiber bragg gratings illustrate high transparent ratio for other wavelengths to implement intra cavity. Therefore, this method has high conversion efficiency and narrow bandwidth output wavelength.

However, this method requires 2n+1 optical fiber bragg gratings for light of nth order stoke frequency shifted wavelength since a bragg grating and two optical fiber bragg gratings that reflect pump light source are required for each order stoke frequency shifted wavelength.

Therefore, as order of stoke frequency shifted wavelength increases, a number of required optical fiber bragg grating also increase, which causes high cost and serious level of complexity. Also, since the conventional methods employs only optical fiber bragg gratings, Raman lasers in accordance with the conventional methods are not stable. The reason for this disadvantage is that an optical fiber bragg grating is sensitive with environmental variables such as intensity and temperature of pump light source.

SUMMARY OF THE INVENTION

An optical fiber cascaded Raman laser scheme is provided. An optical fiber cascaded Raman laser scheme in accordance with an embodiment of the present invention includes a pump light source, an optical fiber, a wavelength division multiplexing optical fiber combiner, another wavelength division multiplexing optical fiber combiner, a short period optical fiber bragg grating, a long period bragg grating, first means, and second means. The pump light source generates pump light. The optical fiber causes Raman scattering regarding the optical pump light as nonlinear material. The wavelength division multiplexing optical fiber combiner forms intra cavity regarding light of second order stoke frequency shifted wavelength. The light is stoke frequency shifted by Raman scattering of the optical fiber. The another wavelength division multiplexing optical fiber combiner forms intra cavity regarding light of first and third order stoke frequency shifted wavelength. The light is stoke frequency shifted by Raman scattering of the optical fiber. The short period optical fiber bragg grating selects and reflects fourth stoke frequency shifted wavelength of output wavelength in intra cavity. The intra cavity is formed by the wavelength division multiplexing optical fiber combiner. The long period bragg grating causes loss on fifth order stoke frequency shifted wavelength and prevents oscillation. The fifth order is next order of output wavelength of the intra cavity. The first means passes pump light emitted from the pump light source and reflects light of fourth order stoke frequency shifted output wavelength. The first means is connected between the pump light source and the wavelength division multiplexing optical fiber combiner. The second means reflects pump light emitted from the pump light source and passing light of output wavelength.

Preferably, the first means comprises a wavelength division Sagnac loop mirror and the second means comprises a short period optical fiber bragg grating having maximum reflection ratio regarding the pump light.

Preferably, the first means comprises a short period optical fiber bragg grating and the second means comprises a short period optical fiber bragg grating having maximum reflection ratio regarding the pump light.

Preferably, the first means comprises a wavelength division Sagnac loop mirror and the second means comprises a wavelength division Sagnac loop mirror.

An optical fiber cascaded Raman laser scheme is provided. An optical fiber cascaded Raman laser scheme in accordance with an embodiment of the present invention includes a pump light source, an optical fiber, a wavelength division multiplexing optical fiber combiner, a short period optical fiber bragg grating, a long period bragg grating, first means, and second means. The pump light source generates pump light. The optical fiber causes Raman scattering regarding the optical pump light as nonlinear material. The wavelength division multiplexing optical fiber combiner forms intra cavity regarding light of first and third order stoke frequency shifted wavelength. The light is stoke frequency shifted by Raman scattering of the optical fiber. The short period optical fiber bragg grating selects and reflects second stoke frequency shifted wavelength of output wavelength in intra cavity. The intra cavity is formed by the wavelength division multiplexing optical fiber combiner. The long period bragg grating causes loss on third order stoke frequency shifted wavelength and prevents oscillation. The fifth order is next order of output wavelength of the intra cavity. The first means passes pump light emitted from the pump light source and reflects light of second order stoke frequency shifted output wavelength. The first means is connected between the pump light source and the wavelength division multiplexing optical fiber combiner. The second means reflects pump light emitted from the pump light source and passes light of output wavelength.

Preferably, the first means comprises a wavelength division Sagnac loop mirror and the second means comprises a short period optical fiber bragg grating.

Preferably, the first means comprises a short period optical fiber bragg grating and the second means comprises a short period optical fiber bragg grating.

Preferably, the first means comprises a wavelength division Sagnac loop mirror and the second means comprises a wavelength division Sagnac loop mirror.

BRIEF DESCRIPTION OF THE DRAWINGS

The embodiments of the present invention will be explained with reference to the accompanying drawings, in which.

DETAILED DESCRIPTION OF THE INVENTION

Figure 1:
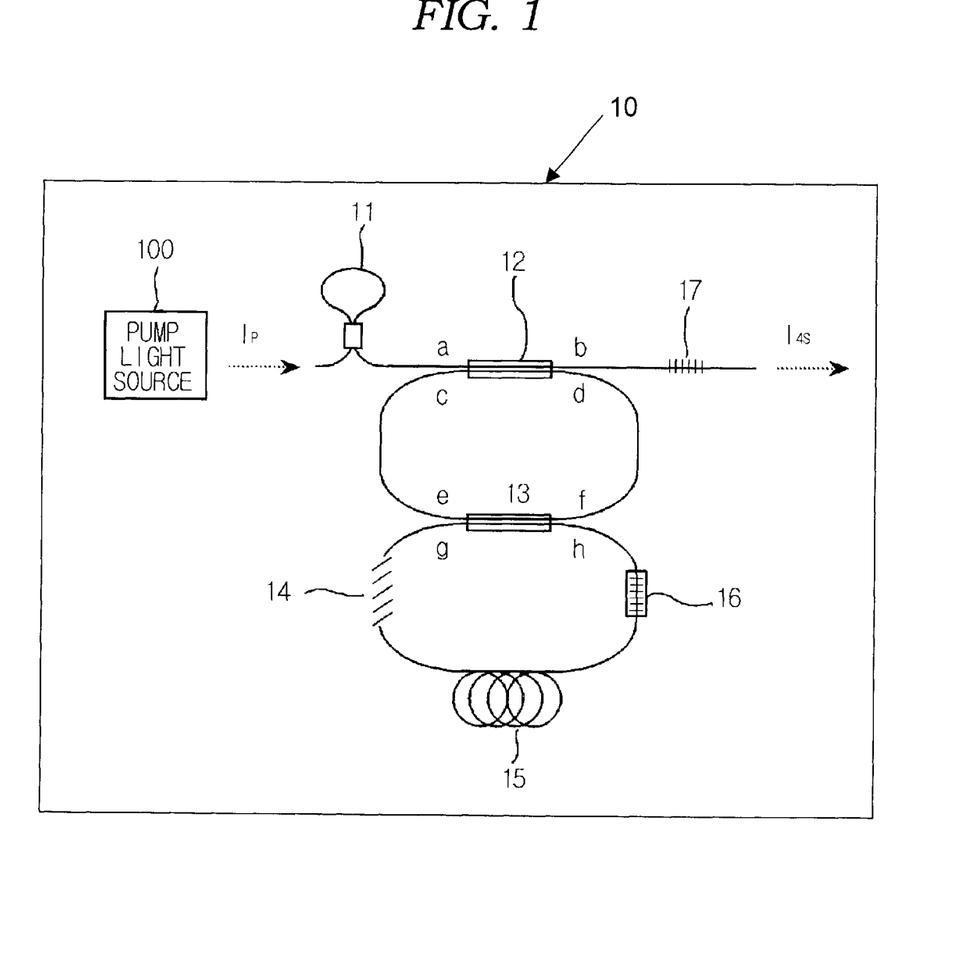
FIG. 1 is a diagram illustrating an optical fiber cascaded Raman laser scheme in accordance with an embodiment of the present invention.
Figure 2A:
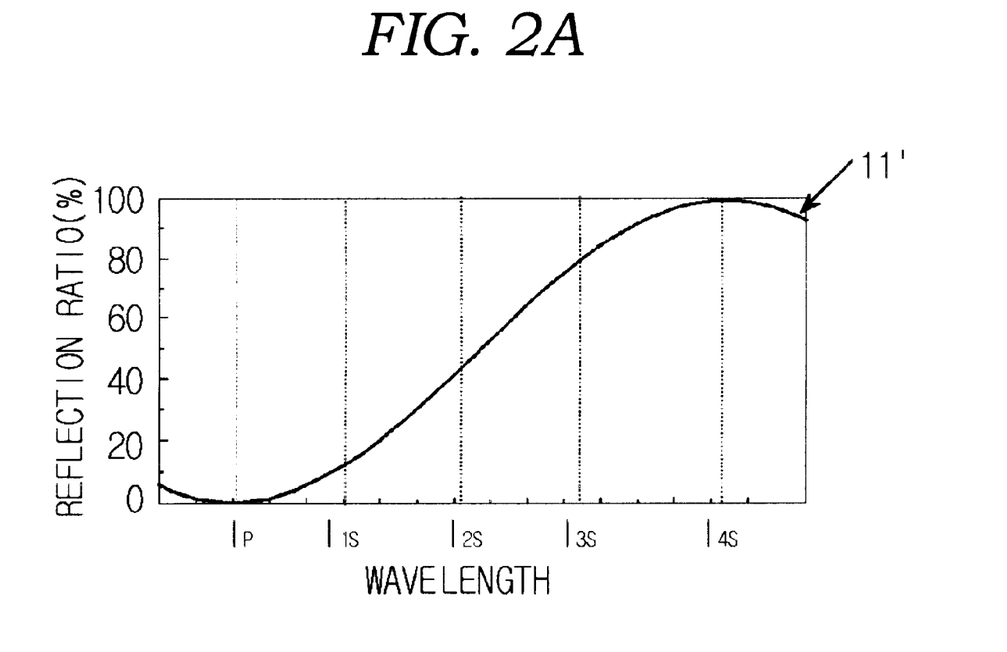
FIG. 2A is a graph illustrating property of Sagnac loop mirror of an optical fiber cascaded Raman laser scheme in accordance with an embodiment of the present invention.
Figure 2B:
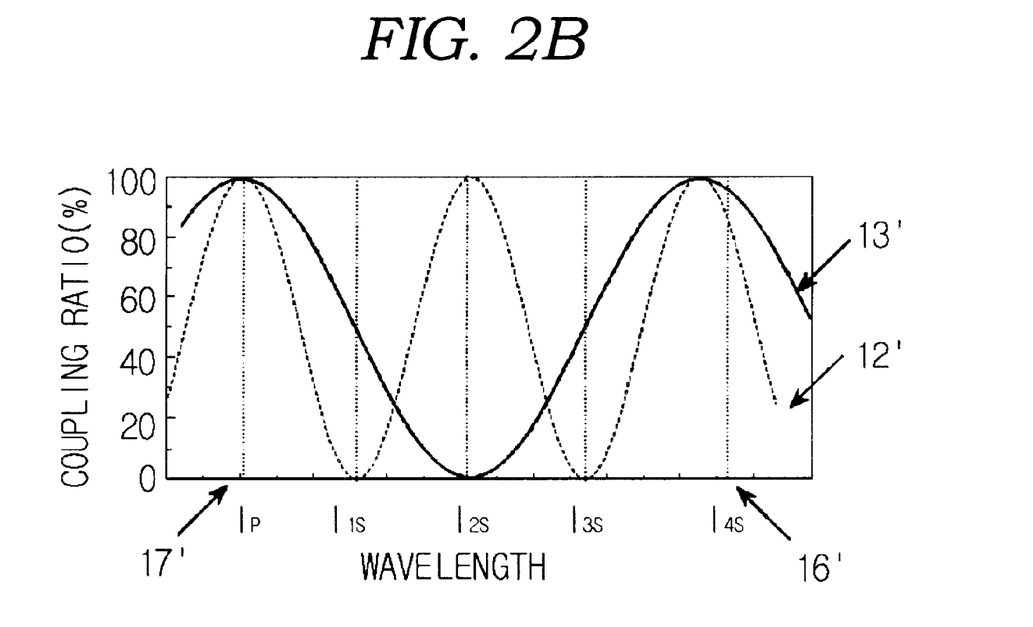
FIG. 2B is a graph illustrating property of combiners of a wavelength division multiplexing optical fiber in accordance with an embodiment of the present invention.

FIG. 1 is a diagram illustrating an optical fiber cascaded Raman laser scheme in accordance with an embodiment of the present invention. FIG. 2A is a graph illustrating property of Sagnac loop mirror of an optical fiber cascaded Raman laser scheme in accordance with an embodiment of the present invention. FIG. 2B is a graph illustrating property of combiners of a wavelength division multiplexing optical fiber in accordance with an embodiment of the present invention.

An optical fiber cascaded Raman laser 10 in accordance with an embodiment of the present invention includes a pump light source 100, an optical fiber 15, second wavelength division multiplexing optical fiber combiner 13, first wavelength division multiplexing optical fiber combiner 12, a short period optical fiber bragg grating 16, a long period bragg grating 14, a wavelength division Sagnac loop mirror 11, and second short period optical fiber bragg grating 17. The pump light source 100 generates pump light. The optical fiber 15 causes Raman scattering regarding the optical pump light as nonlinear material. The second wavelength division multiplexing optical fiber combiner 13 forms intra cavity regarding light of second order stoke frequency shifted wavelength. The light is stoke frequency shifted by Raman scattering of the optical fiber. The first wavelength division multiplexing optical fiber combiner 12 forms intra cavity regarding light of first and third order stoke frequency shifted wavelength. The light is stoke frequency shifted by Raman scattering of the optical fiber. The short period optical fiber bragg grating 16 selects and reflects fourth stoke frequency shifted wavelength of output wavelength in intra cavity. The intra cavity is formed by the wavelength division multiplexing optical fiber combiner. The long period bragg grating 14 causes loss on fifth order stoke frequency shifted wavelength and prevents oscillation. The fifth order is next order of output wavelength of the intra cavity. The wavelength division Sagnac loop mirror passes pump light emitted from the pump light source and reflects light of fourth order stoke frequency shifted output wavelength. The wavelength division Sagnac loop mirror is connected between the pump light source and the wavelength division multiplexing optical fiber combiner. The second short period optical fiber bragg grating 17 reflects pump light emitted from the pump light source and passing light of output wavelength.

Now, using FIG. 1 and FIG. 2, operation of optical fiber cascaded Raman laser in accordance with an embodiment of the present invention is described.

First of all, pump light ($I_p$) generated by the pump source 100 is provided to a port of the first wavelength division multiplexing optical fiber combiner 12 through the wavelength division Sagnac loop mirror 11, as shown in FIG. 2A. The curve 11' in FIG. 2A shows the reflection property of the Sagnac loop mirror 11 as a function of wavelength. The curves 12' and 13' in FIG. 2B indicate the coupling properties of the first and second wavelength division multiplexing optical fiber combiners 12 and 13, respectively, as functions of wavelength. The wavelength of the pump source has almost 100% coupling ratio due to the coupling property of the first wavelength division multiplexing optical fiber combiner 12. Therefore, pump wavelength provided from port a is generated at port d.

Later, pump light generated through d port of the first wavelength division multiplexing optical fiber combiner 12 is provided to f port of the second wavelength division multiplexing optical fiber combiner 13 and again is provided to port g due to the coupling property of the second wavelength division multiplexing optical fiber combiner 13 as shown in FIG. 2B. The light generated to the port g passes the long period bragg grating 14 and then is provided to the optical fiber 15 that is used as Raman active medium. The light passed the optical fiber among input pump light passes the short period optical fiber bragg grating 16 and the is provided to the h-e-c-b ports of the first wavelength division multiplexing optical fiber combiner 12. Then, the light is fully reflected by the second short period optical fiber bragg grating 17 and provided to the optical fiber 15.

Like this, in the process in which light passes the optical fiber 15 back and forth, first order stoke frequency shifted light is oscillated due to Raman effect. Since coupling ratio of the first wavelength division multiplexing optical fiber combiner 12 regarding the first order stoke frequency shifted wavelength $I_{1S}$ is very low, the light of wavelength is not able to pass the ring composed by the c port and d port of the first wavelength division multiplexing optical fiber combiner 12. Therefore, eventually, the light is provided again to the Raman optical fiber 15. Using this process, the first wavelength division multiplexing optical fiber combiner 12 forms intra cavity regarding light of first order stoke frequency shifted wavelength. The intra cavity helps generate stoke frequency shifted wavelength light of the next order efficiently.

Like this, since coupling ratio of the second wavelength division multiplexing optical fiber combiner 13 regarding light of second order stoke frequency shifted wavelength generated by the first order stoke frequency shifted wavelength ($I_{2S}$ in FIGS. 2A and 2B) is very low, intra cavity, regarding light of second order stoke frequency shifted wavelength, is formed by the second wavelength division multiplexing optical fiber combiner 13. The third order stoke frequency shifted light $I_{3S}$ generated in the intra cavity is resonated with light of the first order stoke frequency shifted wavelength in an interactivity composed by the first wavelength division multiplexing optical fiber combiner 12 due to periodical coupling property of the first wavelength division multiplexing optical fiber combiner 12. The third stoke frequency shifted light $I_{3S}$ induces the fourth stoke frequency shifted light $I_{4S}$. Light of the induced fourth stoke frequency shifted wavelength $I_p$ passes the first wavelength division multiplexing optical fiber combiner 12 and the second wavelength division multiplexing optical fiber combiner 13 because coupling ratio of the first wavelength division multiplexing optical fiber combiner 12 and the second wavelength division multiplexing optical fiber combiner 13 is high.

The light of the fourth order stoke frequency shifted wavelength that is passed through the first wavelength division multiplexing optical fiber combiner 12 is reflected upon the wavelength division Sagnac loop mirror 11. Then, the reflected light passes through a-d-f-g ports, the long period bragg grating 14, and the optical fiber 15 and finally it is reflected upon the short period optical fiber bragg grating 16 for resonance.

In such resonance process of light of fourth order stoke frequency shifted wavelength is selected by the short period optical fiber bragg grating 16 whose bandwidth of reflection wavelength is narrow. If coupling ratio of the first wavelength division multiplexing optical fiber combiner 12 is adjusted to have a value other than 0% or 100% regarding wavelength of the selected light $I_{4S}$, a part of light reflected upon the Sagnac loop mirror 11 becomes output light through b port of the first wavelength division multiplexing optical fiber combiner 12 and the second short period optical fiber bragg grating 17.

At the moment, if the intensity of light of fourth order stoke frequency shifted wavelength is large enough, light of fifth order stoke frequency shifted wavelength is generated and output property of the laser may be deteriorated. In such cases, if loss property of the long period bragg grating 14 is manufactured to become maximum for bandwidth of the fifth order stoke frequency shifted wavelength, more higher order stoke frequency shift may be avoided. Loss property of the long period bragg grating 14 should be very low in comparison with the first through fourth order stoke frequency shifted wavelengths.

FIG. 2A is a graph illustrating property of Sagnac loop mirror of an optical fiber cascaded Raman laser scheme in accordance with an embodiment of the present invention. FIG. 2B is a graph illustrating property of combiners of a wavelength division multiplexing optical fiber in accordance with an embodiment of the present invention. The first wavelength division multiplexing optical fiber combiner 12, the second wavelength division multiplexing optical fiber combiner 13, and the Sagnac loop mirror 11 are manufactured by optical fusion method. The first wavelength division multiplexing optical fiber combiner 12, the second wavelength division multiplexing optical fiber combiner 13, and the Sagnac loop mirror 11 also show periodical property of sine function as shown in FIGS. 2A and 2B. In FIGS. 2A and 2B, the wavelength of the pump light is represented as dotted line $I_p$.

The wavelength division Sagnac loop mirror 11 shows very low reflection property regarding the pump light $I_p$, that is, almost zero reflection rate and shows high reflection property regarding the first wavelength division multiplexing optical fiber combiner 12 and the second wavelength division multiplexing optical fiber combiner 13. Also, the pump light $I_p$ has high reflection property regarding the first wavelength division multiplexing optical fiber combiner 12 and the second wavelength division multiplexing optical fiber combiner 13. Therefore, the pump light is provided to the Raman optical fiber material through the first wavelength division multiplexing optical fiber combiner 12 and the second wavelength division multiplexing optical fiber combiner 13 and induces the first order stoke frequency shifted light. As described before, the first wavelength division multiplexing optical fiber combiner 12 shows very low coupling property in response to the first and third stoke frequency shifted wavelengths, $I_{1S}$ and $I_{3S}$. The second wavelength division multiplexing optical fiber combiner 13 shows very low coupling property in response to the second stoke frequency shifted wavelengths, $I_{2S}$. Therefore, the first wavelength division multiplexing optical fiber combiner 12 may form intra cavity regarding the the first and third stoke frequency shifted wavelengths, $I_{1S}$ and $I_{3S}$ and the second wavelength division multiplexing optical fiber combiner 13 may form intra cavity regarding the the second stoke frequency shifted wavelengths, $I_{2S}$. In the figures, 16' indicates the wavelength in which reflection ratio of the short period optical fiber bragg grating 16 is maximized and 17' indicates the wavelength in which reflection ratio of the second short period optical fiber bragg grating 17 is maximized. The second short period optical fiber bragg grating 17 is used for reflecting wavelength of the pump source.

When silica is used as the optical fiber 15, wavelength caused by Raman effect is available through wide range because Raman gain exists through wide frequency range. Therefore, light of the fourth stoke frequency shifted wavelength is selected at the value in which reflection value of the optical fiber bragg grating is maximized. One thing needs to be careful in manufacturing the optical fiber bragg grating is that the first wavelength division multiplexing optical fiber combiner 12 should reflect at the wavelength that is lower than 100% coupling ratio. In this case, the coupling ratio is subtracted from 100% and a part of the subtracted value is not to be resonated and instead is used as the laser output source. Therefore, the first wavelength division multiplexing optical fiber combiner 12 performs like output mirror of the output laser. Optimal condition is to be found by adjusting reflection property in accordance with wavelength of optical fiber bragg grating.

Like this, the cascade Raman laser in accordance with an embodiment of the present invention utilizes periodical property of wavelength division multiplexing optical fiber combiners and generates light of designated wavelength. Consequently, the number of required optical components may be significantly reduced. In addition, output wavelength may be changed by stretching or compressing the short period optical fiber bragg grating 16 that is described in FIG. 1. The structure illustrated in FIG. 1 can be applied to every type of Raman lasers that generate the fourth order stoke frequency shifted wavelength. Also, being different from optical fiber bragg grating, this structure employs wavelength division multiplexing optical fiber combiners that has wide bandwidth and whose property is not various in response to the intensity of transmitted light in order to form intra cavity. Therefore, stable operation is possible regardless of environmental factors such as temperature and intensity of pump source.

The wavelength of the pump source 100 is 1110 nm~1430 nm in order to generate light of 1400 nm~1430 nm in the optical fiber cascaded Raman laser structure in accordance with an embodiment of the present invention. Wavelength division Sagnac loop mirror 11 passes the light of the pump source and reflects light of 1400 nm~1430 nm. The first wavelength division multiplexing optical fiber combiner 12 forms intra cavity regarding the first order stoke frequency shifted wavelength and the third order stoke frequency shifted wavelength of the pump source's wavelength. The second wavelength division multiplexing optical fiber combiner 13 forms intra cavity regarding the second order stoke frequency shifted wavelength of the pump source's wavelength.

The long period bragg grating 14 has maximum loss value regarding the fifth order stoke frequency shifted wavelength of the pump source's wavelength. The first short period optical fiber bragg grating 16 reflects light of 1400 nm~1430 nm and selects output wavelength of the laser. The second short period optical fiber bragg grating 17 fully reflects 1120~1150 nm of pump source and redirects it to the resonator.

Pump source of 1400 nm~1430 nm wavelength generated by the optical fiber cascaded Raman effect is used to amplify optical signal of 1490 nm~1530 nm.

Doubly cladded Ytterbium silica optical fiber lasers pumped by laser diode may be used as pump source of the optical fiber Raman laser in accordance with an embodiment of the present invention.

Figure 3:
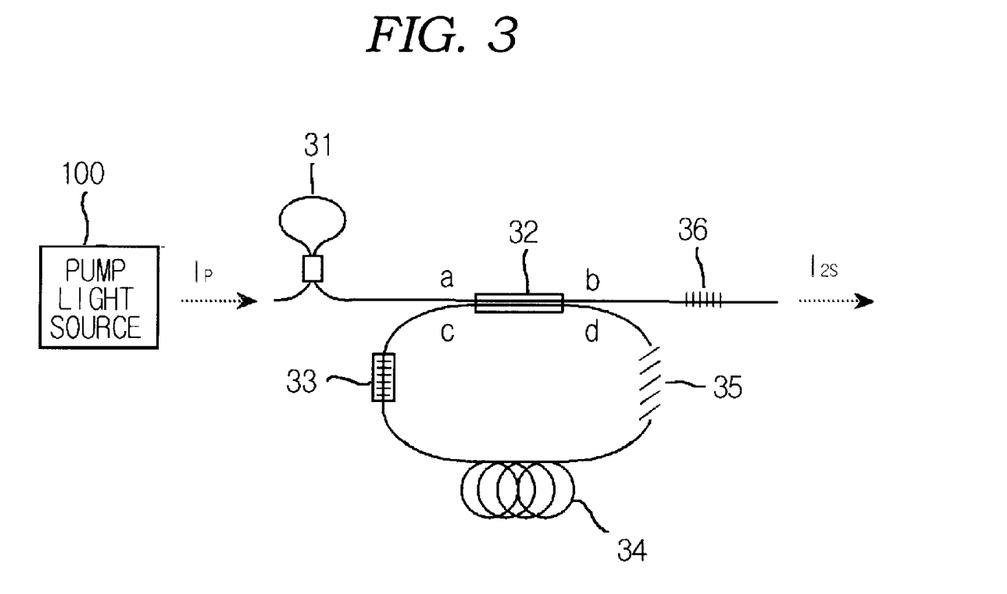
FIG. 3 is a diagram illustrating an optical fiber cascaded Raman laser scheme that generates light of second order stoke frequency shifted wavelength in accordance with an embodiment of the present invention.
Figure 4A:
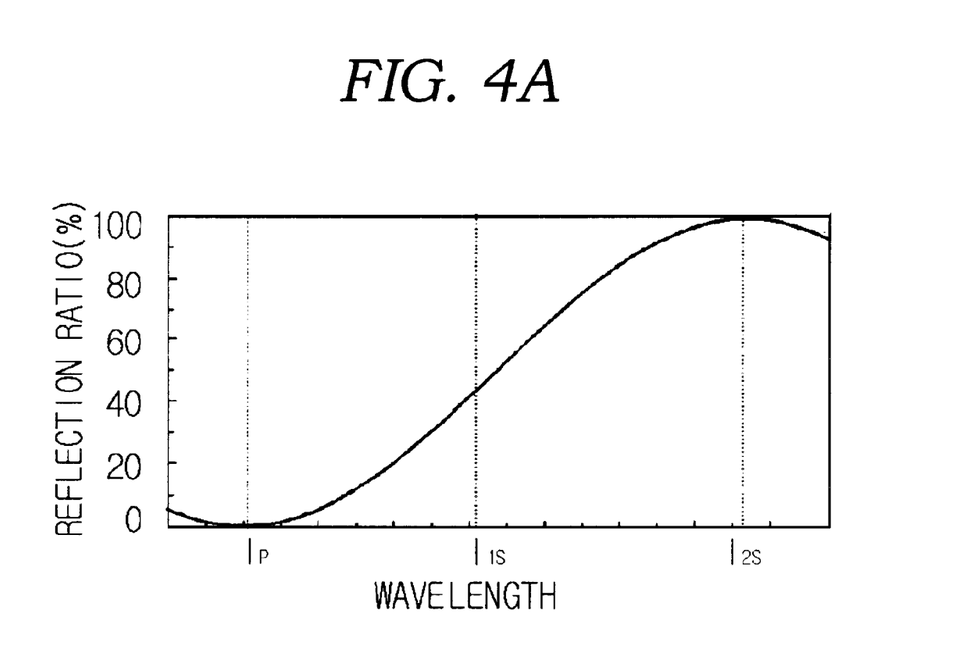
FIG. 4A is a graph illustrating property of Sagnac loop mirror of an optical fiber cascaded Raman laser scheme in accordance with another embodiment of the present invention.
Figure 4B:
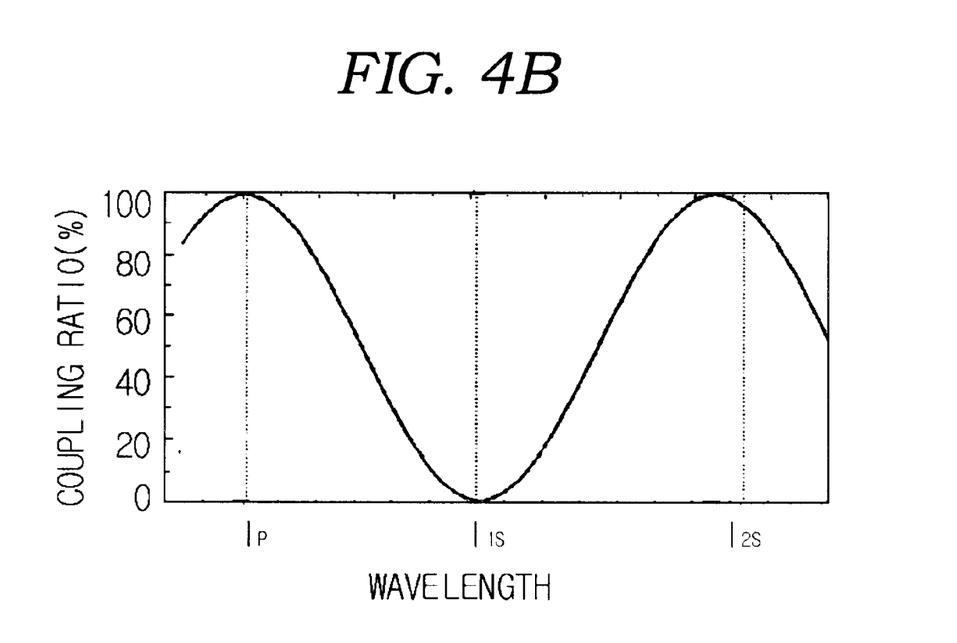
FIG. 4B is a graph illustrating property of combiners of a wavelength division multiplexing optical fiber in accordance with another embodiment of the present invention.

FIG. 3 is a diagram illustrating an optical fiber cascaded Raman laser scheme that generates light of second order stoke frequency shifted wavelength in accordance with an embodiment of the present invention. FIG. 4A is a graph illustrating property of Sagnac loop mirror of an optical fiber cascaded Raman laser scheme in accordance with another embodiment of the present invention. FIG. 4B is a graph illustrating property of combiners of a wavelength division multiplexing optical fiber in accordance with another embodiment of the present invention.

As shown in FIG. 3, pump light $I_p$ generated by pump source 100 is provided to the optical fiber 34 that is used as Raman active medium through a-d of the wavelength division multiplexing optical fiber combiner 32 and the wavelength division multiplexing Sagnac loop mirror 31. Light passing the optical fiber 34 among input pump light is provided to the optical fiber 34 through the short period optical fiber 33, the c-b port of the wavelength division multiplexing optical fiber combiner 32, and the second short period optical fiber 36. In the middle of the process in which light passes the optical fiber 34 back and forth, light of the first order stoke frequency shifted wavelength is generated due to nonlinear Raman effect. Wavelength division multiplexing optical fiber combiner forms intra cavity regarding the first order stoke frequency shifted wavelength, $I_{1S}$. The formed intra cavity helps generate stoke frequency shifted wavelength light of the next order efficiently.

The generated second order stoke frequency shifted is resonated by the wavelength division Sagnac loop mirror 31 and the first short period optical fiber bragg grating 33 and the wavelength is selected by the first short period optical fiber bragg grating 33. The long period bragg grating 35 is manufactured to become maximum for bandwidth of the third order stoke frequency shifted wavelength and therefore more higher order stoke frequency shift may be avoided.

FIG. 4A is a graph illustrating property of Sagnac loop mirror of an optical fiber cascaded Raman laser scheme in accordance with another embodiment of the present invention. FIG. 4B is a graph illustrating property of combiners of a wavelength division multiplexing optical fiber in accordance with another embodiment of the present invention. The first order stoke frequency shifted light is generated and resonated around wavelength $I_{1S}$ in which coupling ratio has minimum value. Output wavelength of the laser is determined at the first short period optical fiber bragg grating 33.

As stated above, the optical fiber cascaded Raman laser scheme in accordance with an embodiment of the present invention is advantageous in that the number of required optical components may be significantly reduced and output wavelength may be varied. By selecting appropriate pump light, the optical fiber cascaded Raman laser scheme in accordance with an embodiment of the present invention is able to obtain output of several wavelength bandwidth. Since gain bandwidth of the silica optical fiber is very wide, wide gain bandwidth can be obtained by converting stoke frequency continuously and therefore high power optical fiber laser source with variable wavelength is achievable.

In an embodiment of the present invention, a wavelength division Sagnac loop mirror 11 is used as a device passing pump light, reflecting light of the fourth stoke frequency shifted Raman laser output wavelength. However, a short period optical fiber bragg grating may be used instead of the wavelength division Sagnac loop mirror 11.

In addition, in an embodiment of the present invention, the second short period optical fiber bragg grating 17 is used as a device reflecting pump light and passing light of the fourth stoke frequency shifted Raman laser output wavelength. However, a wavelength division Sagnac loop mirror may be used instead of the second short period optical fiber bragg grating 17.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An optical fiber cascaded Raman laser scheme, comprising:

a pump light source for generating a pump light;

an optical fiber for causing Raman scattering regarding the pump light as nonlinear material;

a first wavelength division multiplexing optical fiber combiner for forming an intra cavity regarding light of second order stoke frequency shifted wavelength, the light being stoke frequency shifted by Raman scattering of the optical fiber;

a second wavelength division multiplexing optical fiber combiner for forming the intra cavity regarding light of first and third order stoke frequency shifted wavelength, the light being stoke frequency shifted by Raman scattering of the optical fiber;

a short period optical fiber bragg grating for selecting and reflecting fourth stoke frequency shifted wavelength of output wavelength in intra cavity, the intra cavity being formed by the wavelength division multiplexing optical fiber combiner;

a long period bragg grating for causing loss on fifth order stoke frequency shifted wavelength and preventing oscillation, the fifth order being next order of output wavelength of the intra cavity;

first means for passing pump light emitted from the pump light source and reflecting light of fourth order stoke frequency shifted output wavelength, the first means being connected between the pump light source and the wavelength division multiplexing optical fiber combiner; and second means for reflecting pump light emitted from the pump light source and passing light of output wavelength.

2. The optical fiber cascaded Raman laser scheme of claim 1, wherein the first means comprises a wavelength division Sagnac loop mirror and the second means comprises a short period optical fiber bragg grating having maximum reflection ratio regarding the pump light.

3. The optical fiber cascaded Raman laser scheme of claim 1, wherein the first means comprises a short period optical fiber bragg grating and the second means comprises a short period optical fiber bragg grating having maximum reflection ratio regarding the pump light.

4. The optical fiber cascaded Raman laser scheme of claim 1, wherein the first means comprises a wavelength division Sagnac loop mirror and the second means comprises a wavelength division Sagnac loop mirror.

5. An optical fiber cascaded Raman laser scheme, comprising:

a pump light source for generating pump light;

an optical fiber for causing Raman scattering regarding the optical pump light as nonlinear material;

a wavelength division multiplexing optical fiber combiner for forming intra cavity regarding light of first and third order stoke frequency shifted wavelength, the light being stoke frequency shifted by Raman scattering of the optical fiber;

a short period optical fiber bragg grating for selecting and reflecting second stoke frequency shifted wavelength of output wavelength in intra cavity, the intra cavity being formed by the wavelength division multiplexing optical fiber combiner;

a long period bragg grating for causing loss on third order stoke frequency shifted wavelength and preventing oscillation, the fifth order being next order of output wavelength of the intra cavity;

first means for passing pump light emitted from the pump light source and reflecting light of second order stoke frequency shifted output wavelength, the first means being connected between the pump light source and the wavelength division multiplexing optical fiber combiner; and second means for reflecting pump light emitted from the pump light source and passing light of output wavelength.

6. The optical fiber cascaded Raman laser scheme of claim 5, wherein the first means comprises a wavelength division Sagnac loop mirror and the second means comprises a short period optical fiber bragg grating.

7. The optical fiber cascaded Raman laser scheme of claim 5, wherein the first means comprises a short period optical fiber bragg grating and the second means comprises a short period optical fiber bragg grating.

8. The optical fiber cascaded Raman laser scheme of claim 5, wherein the first means comprises a wavelength division Sagnac loop mirror and the second means comprises a wavelength division Sagnac loop mirror.

* * * * *